United States Patent
Wang et al.

(10) Patent No.: US 11,798,561 B2
(45) Date of Patent: Oct. 24, 2023

(54) METHOD, APPARATUS, AND NON-TRANSITORY COMPUTER READABLE MEDIUM FOR PROCESSING AUDIO OF VIRTUAL MEETING ROOM

(71) Applicant: Fulian Precision Electronics (Tianjin) Co., LTD., Tianjin (CN)

(72) Inventors: Cheng-Yu Wang, New Taipei (TW); Po-Cheng Chen, New Taipei (TW); Yu-Te Lee, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 72 days.

(21) Appl. No.: 17/566,250

(22) Filed: Dec. 30, 2021

(65) Prior Publication Data

US 2023/0169982 A1  Jun. 1, 2023

(30) Foreign Application Priority Data

Nov. 30, 2021 (CN) .......................... 202111450520.9

(51) Int. Cl.
| | |
|---|---|
| *G10L 17/06* | (2013.01) |
| *G06T 17/20* | (2006.01) |
| *G10L 17/02* | (2013.01) |
| *G10L 21/007* | (2013.01) |
| *G06T 7/20* | (2017.01) |

(52) U.S. Cl.
CPC .................. *G10L 17/06* (2013.01); *G06T 7/20* (2013.01); *G06T 17/20* (2013.01); *G10L 17/02* (2013.01); *G10L 21/007* (2013.01); *G06T 2207/30201* (2013.01)

(58) Field of Classification Search
CPC ... G10L 17/06; G06T 7/20; G06T 17/20; G10L 17/02; G10L 21/007
See application file for complete search history.

(56) References Cited

U.S. PATENT DOCUMENTS

| | | | |
|---|---|---|---|
| 2007/0247524 A1 | 10/2007 | Yoshinaga et al. | |
| 2008/0091512 A1* | 4/2008 | Marci et al. ............. | A61B 5/16 705/7.29 |
| 2012/0124456 A1* | 5/2012 | Perez et al. ....... | H04N 21/44218 715/200 |
| 2012/0185291 A1* | 7/2012 | Ramaswamy et al. ..................... | G06Q 10/1095 705/7.19 |
| 2016/0191995 A1* | 6/2016 | el Kaliouby et al. | H04N 21/812 725/12 |
| 2020/0336529 A1* | 10/2020 | Van Wie et al. .... | G06F 3/04815 |

FOREIGN PATENT DOCUMENTS

| | | |
|---|---|---|
| CN | 102007730 B | 9/2014 |
| CN | 110035250 A * | 7/2019 |

* cited by examiner

*Primary Examiner* — Terrell M Robinson
(74) *Attorney, Agent, or Firm* — ScienBiziP, P.C.

(57) ABSTRACT

A method for processing audio generated in a virtual meeting room (VMR) includes setting a quantity of mesh vertexes according to seats in the VMR, obtaining first voiceprint information of a presenter, the first voiceprint information comprising a frequency, an amplitude, and a phase difference of an audio signal, adjusting the frequency or amplitude of the first voiceprint information according to the quantity of the mesh vertexes, and obtaining second voiceprint information; and determining a seat of the presenter in the VMR according to the second voiceprint information. An apparatus and a non-transitory computer readable medium for processing audio as above are also disclosed.

13 Claims, 10 Drawing Sheets

METHOD, APPARATUS, AND NON-TRANSITORY COMPUTER READABLE MEDIUM FOR PROCESSING AUDIO OF VIRTUAL MEETING ROOM

CROSS-REFERENCE TO RELATED APPLICATIONS

This application claims priority to Chinese Patent Application No. 202111450520.9 filed on Nov. 30, 2021, the contents of which are incorporated by reference herein.

FIELD

The subject matter herein generally relates to virtual meeting room technology, and particularly to a method, an apparatus, and a non-transitory computer readable medium for processing audio of a virtual meeting room.

BACKGROUND

A virtual meeting room (VMR) has high efficiency and is a convenient network meeting room. Users with mobile terminals, such as mobile phones and computers, may rapidly and conveniently establish a virtual meeting with other users, with any limitations of time and space. However, the VRM may zoom in to presenters or speakers in the VRM, but is hard to differentiate voices from different presenters. When several presenters speak at the same time, differentiating between speakers and their spoken content is problematic.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to", the term indicates open-ended inclusion or membership in a so-described combination, group, series, and the like.

Figure 1:
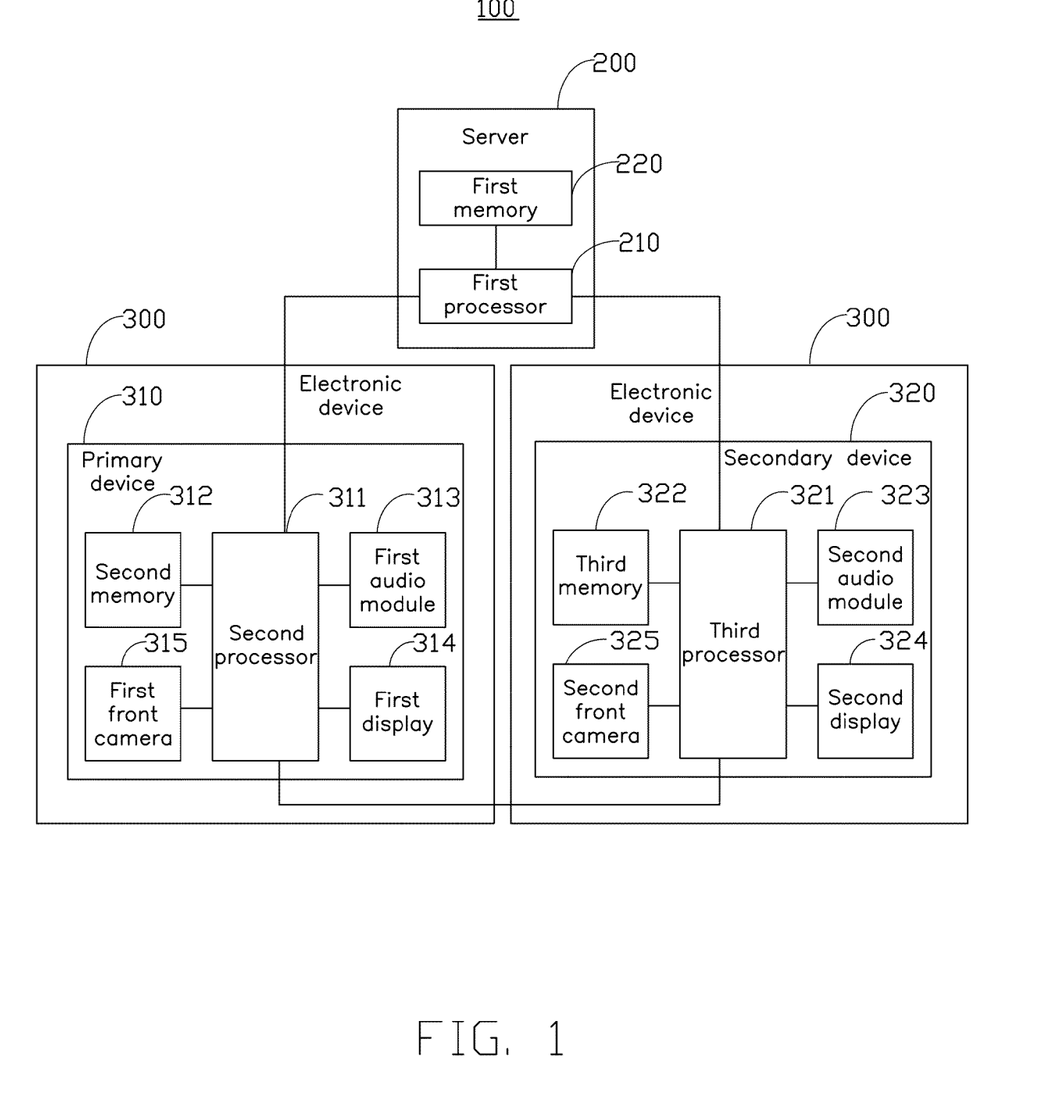
FIG. 1 illustrates a schematic view of at least one embodiment of an apparatus for processing audio.

FIG. 1 illustrates an apparatus 100 for processing audio. The apparatus 100 includes a server 200 and an electronic device 300. The electronic device 300 includes a primary device 310 and a secondary device 320. The primary device 310 is a device used by a host in a meeting, the secondary device 320 are one or more devices used by other attendees of the meeting. The server 200 is communicating with the primary device 310 and the secondary device 320. The host may start a virtual meeting through the primary device 310, the server 200 may establish a virtual meeting room (VMR) based on instructions from the primary device 310, the primary device 310 may transmit a meeting link to the secondary device 320, other attendees may join the VMR through their secondary device 320.

The communication among the server 200, the primary device 310, and the secondary device 320 may include wired or wireless communications. The wired communication includes connections through wire transmission mediums such as fibers or twisted-pair cables. The wireless communication includes connections through wireless transmission mediums such as WI-FI or mobile communications networks (2G/3G/4G/5G for example).

In at least one embodiment, the apparatus 100 further includes a 360 degree fisheye camera (not shown), which may be a panorama camera that can independently capture or monitor videos and images in a large range. The 360 degree fisheye camera is in communication with the server 200. The 360 degree fisheye camera may be arranged above some cubicles in an office for capturing or monitoring videos and/or images of some cubicles. The server 200 may map the videos and/or images to a VMR model, so the people on the cubicles may feel like being in the VMR. When the images captured by the camera are inverted, the server 200 may invert the images for being displayed by the primary device 310 and the secondary device 320, so as to revise the direction of the images.

The server 200 may include a first processor 210 and a first memory 220. The first processor 210 can run computer programs and instructions stored in the first memory 220 to perform the method for processing audio.

In at least one embodiment, the first processor 210 can be formed by integrated circuits, such as an individual integrated circuit or multiple integrated circuits with a same function or different functions. The first processor 210 includes, but is not limited to, a central processing unit (CPU), a microprocessor, a digital signal processor (DSP), a graphics processor, an application specific integrated circuit (ASIC), a field-programmable gate array (FPGA), a data processor chip, a programable logic device (PLD), a discrete gate/transistor logic device, or a discrete hardware component. The first processor 210 may be a control unit and electrically connected to other elements of the server 200 through interfaces or a bus. In at least one embodiment, the various types of non-transitory computer-readable storage mediums stored in the first memory 220 can be processed by the first processor 210 to perform various functions, such as the method for processing audio.

In at least one embodiment, the first processor 210 may further include one or more interfaces or connectors, which can be but are not limited to, Inter-Integrated Circuit (I2C) interface, Inter-Integrated Circuit Sound (I2S) interface, Pulse Code Modulation (PCM) interface, Universal Asynchronous Receiver/Transmitter (UART) interface, Mobile Industry Processor Interface (MIPI), General-Purpose Input/Output (GPIO) interface, Subscriber Identity Module (SIM) interface, Universal Serial Bus (USB), etc.

In at least one embodiment, the first memory 220 can include various types of non-transitory computer-readable storage mediums. For example, the first memory 220 can store local paths and the server 200 for processing audio. The first memory 220 can rapidly and automatically access instructions and data when the server 200 is running. The first memory 220 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), Compact Disc Read-Only Memory (CD-ROM) for permanent storage of information. The first memory 220 can also be an external storage system, such as a hard disk, a storage card, or a data storage medium.

In at least one embodiment, the server 200 may include a plurality of virtual machines (VMs). The server 200 may include functions of high availability (HA) and auto scaling. The high availability means redundancy of processing, for when a node is unavailable or not capable of processing a request from the user, the request may be migrated to other available nodes. The auto scaling means an ability of auto adjusting computing (that is a quantity of instances) according to business requirements and strategies. When the business requirements increase, the auto scaling may automatically increase the instances of predetermined categories, so as to ensure continuous computing ability. When the business requirements decrease, the auto scaling may automatically decrease the instances of predetermined categories, so as to save the cost.

In at least one embodiment, the primary device 310 may include a second processor 311, a second memory 312, a first audio module 313, and a first display 314. The second processor 311 is electrically connected to the second memory 312, the first audio module 313, the first display 314, and the first processor 210. The first audio module 313 is configured to apply an analog-to-digital conversion, coding, and decoding to audio signals. The first display 314 is configured to display a scene of the VMR and images of a part of the participants. The second processor 311 can run computer programs and instructions stored in the second memory 312 to perform the method for processing audio.

In at least one embodiment, the primary device 310 may include virtual reality (VR) glasses or head-mounted device (HMD) for tracking a degree of freedom (DoF) of movement directions of user's eyes.

The second processor 311 and the second memory 312 can be similar to the first processor 210 and the first memory 220 as described before.

In at least one embodiment, the first audio module 313 may be arranged in the second processor 311, or be a part of the functional modules of the first audio module 313 arranged in the second processor 311. The primary device 310 may perform audio functions, such as playing audio and/or recording, according to the first audio module 313.

In other embodiments, the primary device 310 may further include a first front camera 315 electrically connected to the second processor 311. The first front camera 315 is configured to capture images of human faces and movement of eyes for supporting the server 200 to analyze a level of concentration and a level of interest of the participants to the meeting.

In at least one embodiment, the primary device 310 may be any electronic device, such as personal computers, tablet computers, smart phones, personal digital assistants (PDAs), etc.

In at least one embodiment, the secondary device 320 may include a third processor 321, a third memory 322, a second audio module 323, a second display 324, and a second front camera 325. The third processor 321 is electrically connected to the third memory 322, the second audio module 323, the second display 324, the second front camera 325, the first processor 210, and the second processor 311.

The modules and elements of the secondary device 320 may be similar to the primary device 310 as described above.

Figure 2:
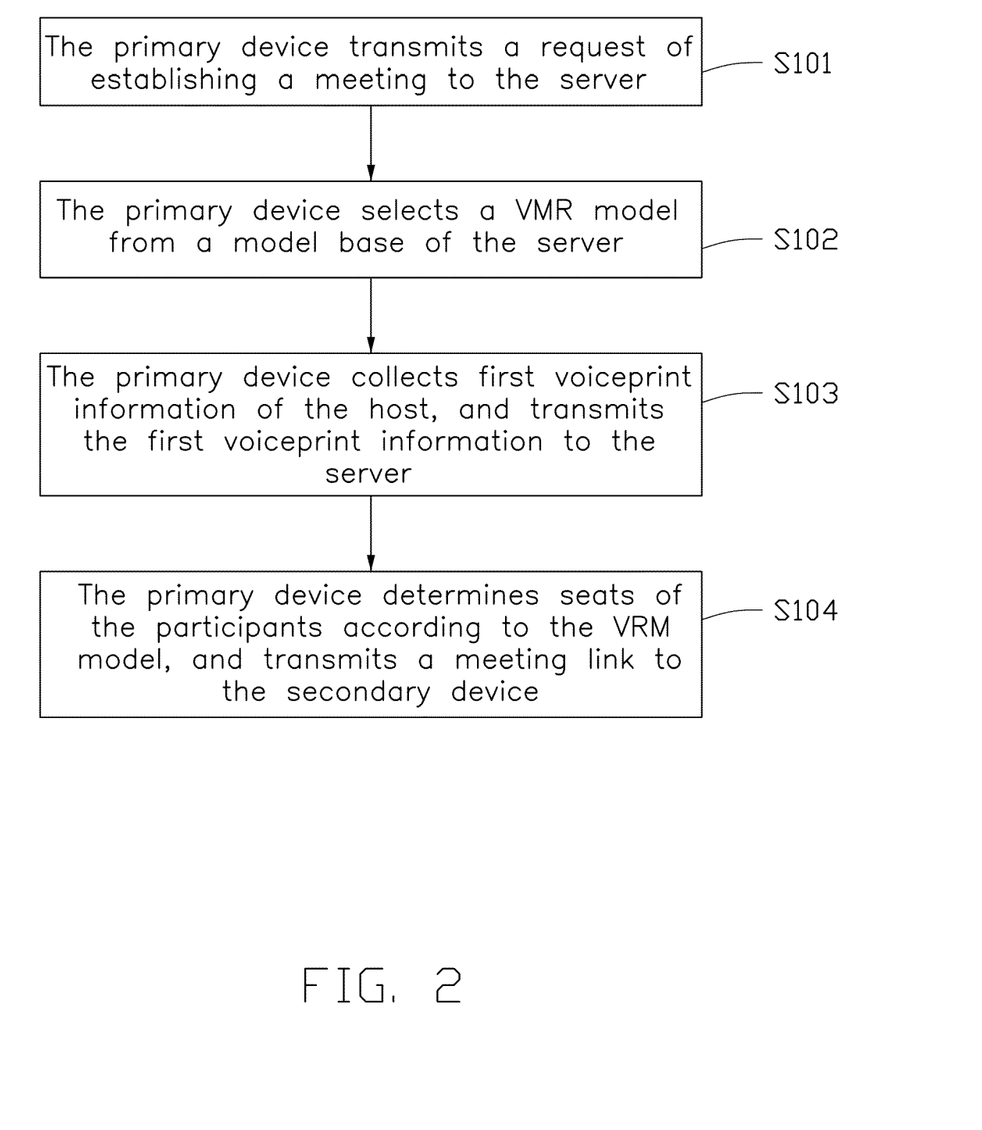
FIG. 2 is a flowchart of at least one embodiment of a method for processing audio.

FIG. 2 illustrates a flowchart of at least one embodiment of a method for processing audio.

In at least one embodiment, the method for processing audio may be applied in an apparatus, such as the primary device 310 shown in FIG. 1. The functions may be integrated in the primary device 310 for the method for processing audio. In another embodiment, the method for processing audio can be run in a form of software development kit in the apparatus.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S101.

At block S101, in response to a first operation of the host, the primary device 310 transmits a request of establishing a meeting to the server 200.

The first operation may include triggering a control of establishing meeting in a three dimensional image software (such as Blender) in the primary device 310.

In at least one embodiment, the primary device 310 may install the three dimensional image software, the host can trigger the control of establishing meeting in the three dimensional image software, so the primary device 310 transmits the request of establishing a meeting to the server 200. The three dimensional image software provides comprehensive three dimensional authoring tools, which may include Modeling, UV-Mapping, Texturing, Rigging, Skinning, Animation, Particle, Physics, Scripting, Rendering, Motion Tracking, Compositing, Post-production, etc.

At block S102, in response to a second operation of the host, the primary device 310 selects a VMR model from a model base of the server 200.

The second operation may include triggering a control of selecting VMR model in the three-dimensional image software in the primary device 310.

Figure 3A:
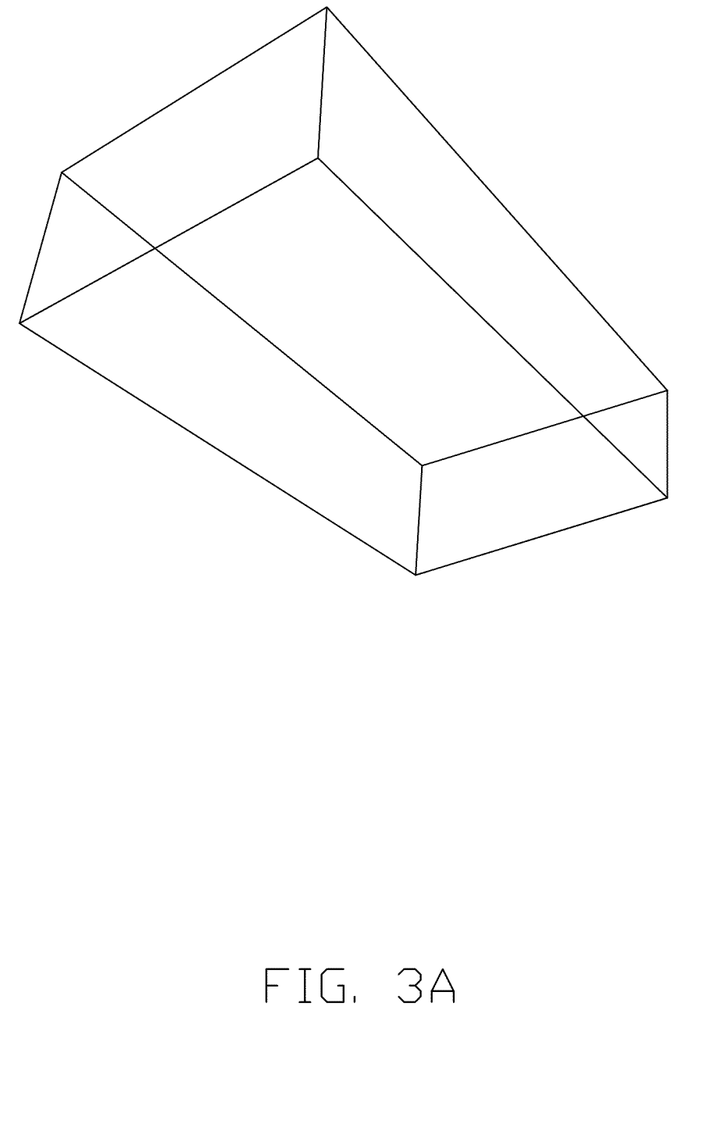
FIG. 3A illustrates a schematic view of at least one embodiment of a virtual meeting room.
Figure 3B:
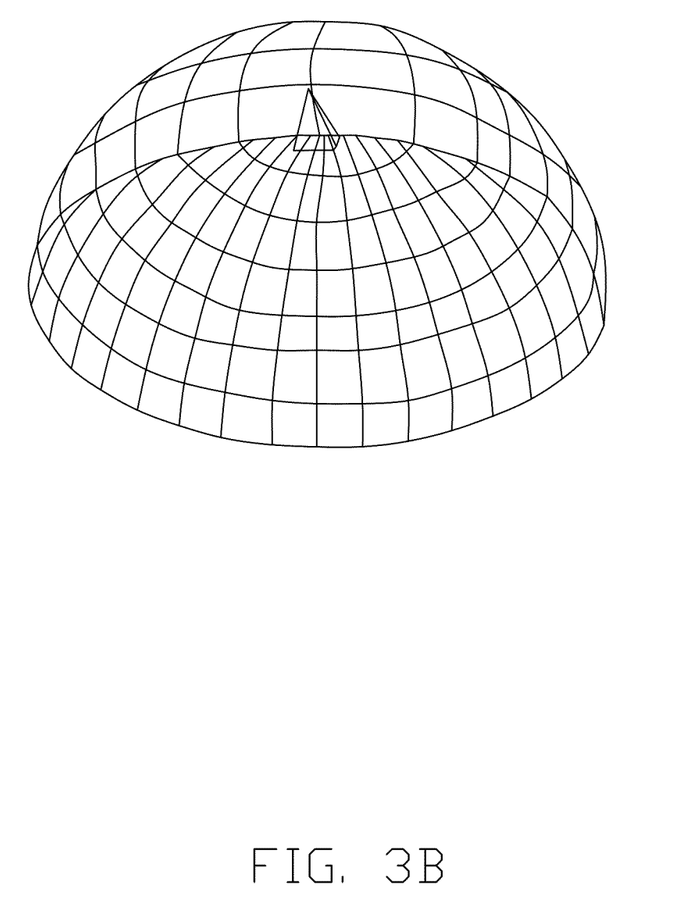
FIG. 3B illustrates a schematic view of another embodiment of the virtual meeting room.

Referring to FIGS. 3A and 3B, the model base may store a plurality of structural characteristics of the VMR, such as rectangular VMRs and circular VMRs. The server 200 receives the request of establishing the meeting from the primary device 310 and allows being accessed to the model base by the primary device 310. The host may select a VMR model in the three-dimensional image software, to trigger the control of selecting VMR model, so the primary device 310 selects the VMR model from the model base of the server 200.

At block S103, in response to a third operation of the host, the primary device 310 collects first voiceprint information of the host, and transmits the first voiceprint information to the server 200.

The third operation may include triggering a control of recording audio in the three-dimensional image software in the primary device 310.

In at least one embodiment, after the primary device 310 determined the VRM model, the host triggers the control of recording audio in the three-dimensional image software in the primary device 310, the primary device 310 records audio signals of the host through the first audio module 313 and extracts the first voiceprint information of the host from the audio signals, and further transmits the first voiceprint information to the server 200. The first voiceprint information may include frequencies, amplitudes, and phase differences of the audio signals.

At block S104, in response to a fourth operation of the host, the primary device 310 determines seats of the participants according to the VRM model, and transmits a meeting link to the secondary device 320.

The fourth operation may include triggering a control of adding meeting link in the three-dimensional image software in the primary device 310.

In at least one embodiment, after the primary device 310 transmits the first voiceprint information of the host to the server 200, the host triggers the control of adding meeting link in the three-dimensional image software in the primary device 310, the primary device 310 determines seats of the participants according to the VMR model, each of the seats in the VMR is corresponding to one meeting link. The primary device 310 transmits the meeting link to the secondary device 320.

For instance, the VMR may arrange N seats, each of the seats in the VMR is corresponding to one meeting link, the primary device 310 may transmit the N meeting links to N secondary devices 320, respectively. The participants can access to the VMR according to one of the meeting links, observe the VMR and other participants from an angle of view of the seat, and speak in the meeting.

In at least one embodiment, the VMR may further arrange several visitor's seats, each of the visitor's seats is corresponding to one meeting link. The primary device 310 may transmit M meeting links of the visitor's seats to M secondary devices 320, respectively. The participants can access to the VMR according to one of the meeting links of the visitor's seats, and observe the VMR and other participants from an angle of view of the visitor's seat, but the participants in the visitor's seats cannot speak in the meeting. The N and M are positive integers.

In other embodiments, the primary device 310 mat transmit the meeting links to several secondary devices 320. The participants can access to the VMR according to the meeting links and select the seats in the VMR.

Figure 4:
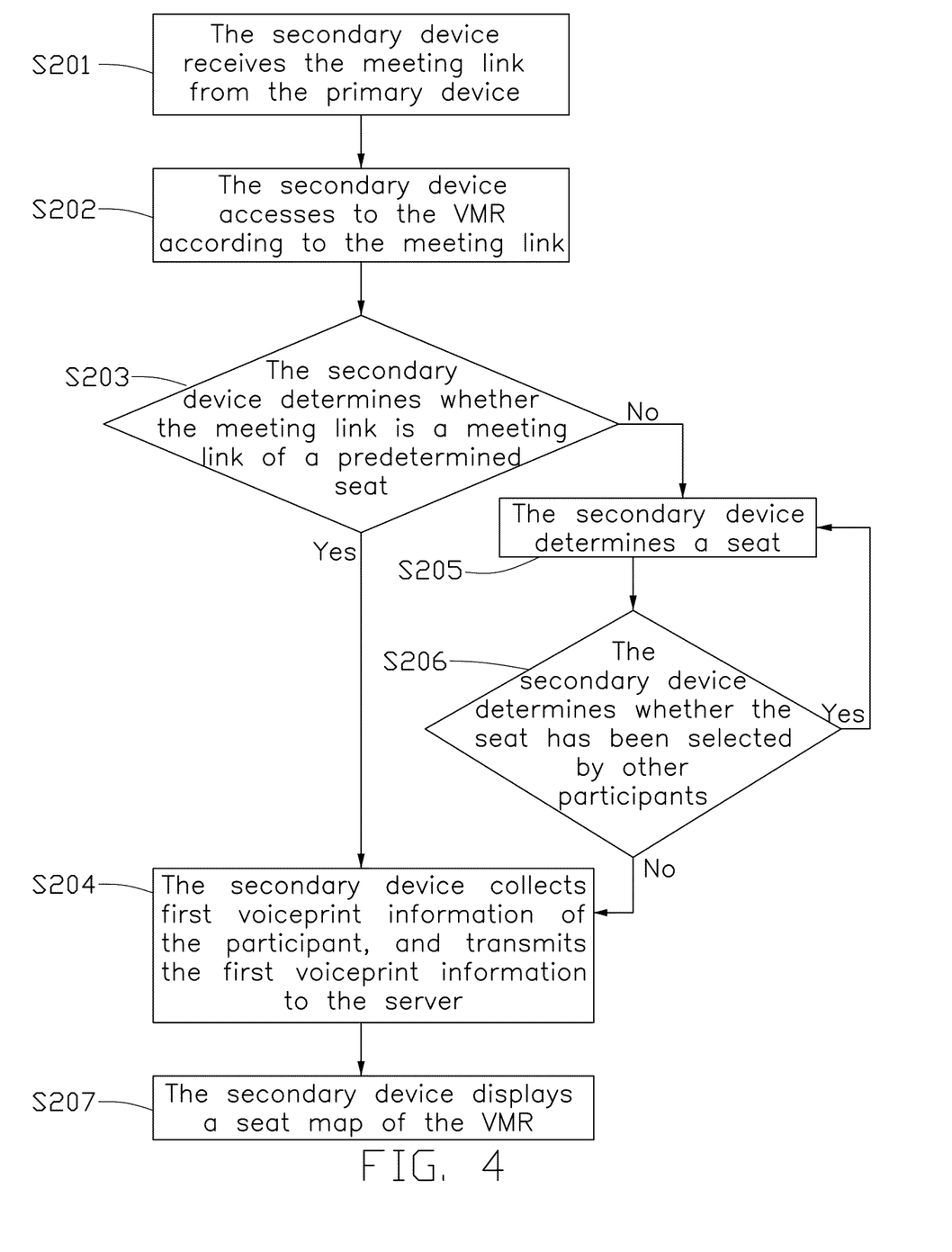
FIG. 4 is a flowchart of another embodiment of the method for processing audio.

FIG. 4 illustrates a flowchart of another embodiment of the method of the for processing audio.

In at least one embodiment, the method for processing audio may be applied in an apparatus, such as the secondary device 320 shown in FIG. 1. The functions may be integrated in the secondary device 320 for the method for processing audio. In another embodiment, the method for processing audio can be run in a form of software development kit in the apparatus.

The method is provided by way of example, as there are a variety of ways to carry out the method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S201.

At block S201, the secondary device 320 receives the meeting link from the primary device 310.

In at least one embodiment, the primary device 310 establishes the VMR and transmits the meeting links of the VRM or the meeting links of the seats in the VRM to the participants. The participants receive the meeting links from the primary device 310.

At block S202, in response to a first operation of the participant, the secondary device 320 accesses to the VMR according to the meeting link.

The first operation may include clicking the meeting link in the secondary device 320, and activating a browser application (such as Chrome Browser).

Figure 5:
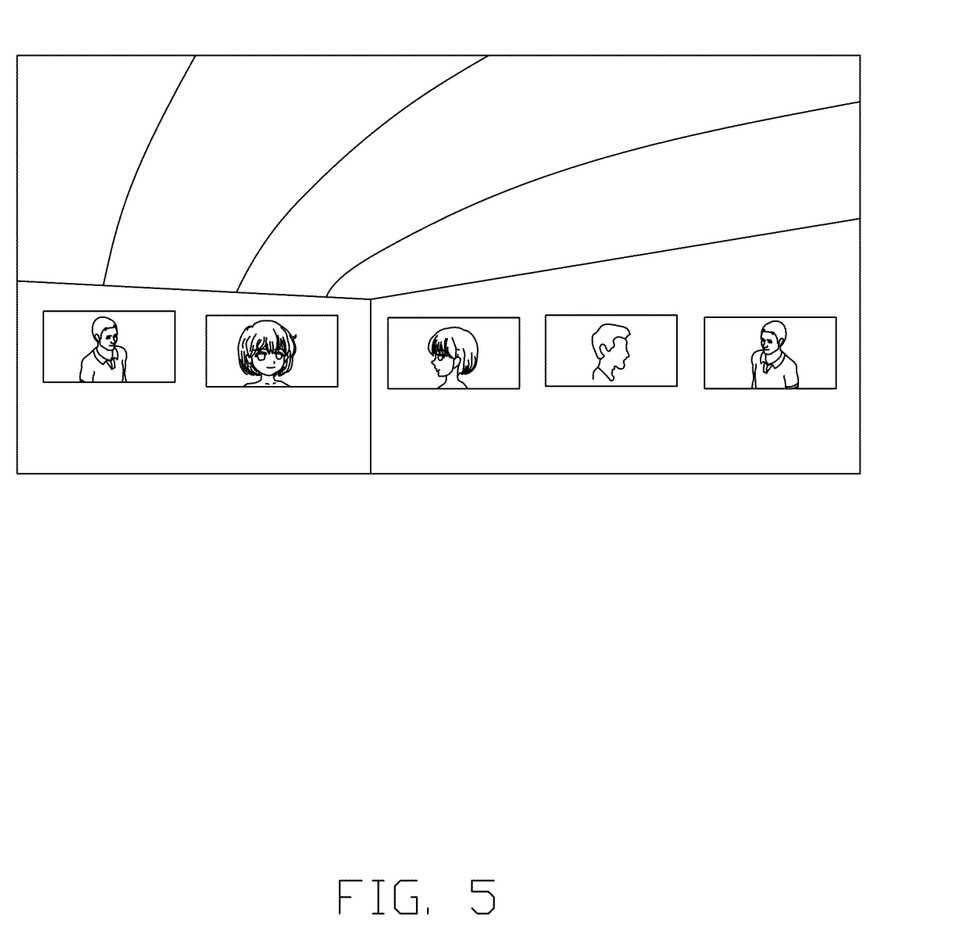
FIG. 5 illustrates a schematic view of at least one embodiment of the virtual meeting room.

Referring to FIG. 5, the secondary device 320 receive the meeting link from the primary device 310, the participant clicks the meeting link in the secondary device 320 to activate a browser application, so as to access to the VMR through the browser application.

At block S203, the secondary device 320 determines whether the meeting link is a meeting link of a predetermined seat according to whether there is a seat for the participant in the VMR. If the meeting link is a meeting link of a predetermined seat, the procedure goes to block S204. If the meeting link is not a meeting link of a predetermined seat, the procedure goes to block S205.

In at least one embodiment, the secondary device 320 accesses to the VMR through the meeting link, and determines whether the meeting link is a meeting link of a predetermined seat according to whether there is a seat for the participant of the secondary device 320 in the VMR. If there is a seat for the participant, the secondary device 320 displays a scene of the VMR and other participants from an angle of view of the predetermined seat. If there is no seat for the participant, the secondary device 320 displays a scene of the whole VMR. The secondary device 320 can determine whether there is a seat for the participant according to different angels of view in the VMR, so as to determine whether the meeting link is a meeting link of a predetermined seat.

At block S204, in response to a second operation of the participant, the secondary device 320 collects first voiceprint information of the participant, and transmits the first voiceprint information to the server 200.

The second operation may include triggering a control of recording audio in the browser application.

In at least one embodiment, after the secondary device 320 determined the meeting link is a meeting link of a predetermined seat, the participant may trigger the control of recording audio in the browser application of the secondary device 320, the secondary device 320 records audio signals of the participant by the second audio module 323 and extracts the first voiceprint information of the participant from the audio signals, and further transmits the first voiceprint information to the server 200.

At block S205, in response to a third operation of the participant, the secondary device 320 determines a seat.

The third operation may include triggering a control of selecting seat in the browser application of the secondary device 320.

In at least one embodiment, after the secondary device 320 determined the meeting link is not a meeting link of a predetermined seat, the participant may trigger the control of selecting seat in the browser application of the secondary device 320, the secondary device 320 selects a seat and reads selected information of the seat. The selected information of the seat includes the seat is selected or to be selected.

At block S206, the secondary device 320 determines whether the seat has been selected by other participants. If the seat has been selected by other participants, the procedure goes to block S205. If the seat hasn't been selected by other participants, the procedure goes to block S204.

In at least one embodiment, after the participant selected the seat through the secondary device 320, the secondary device 320 reads the selected information of the seat, so as to determine whether the seat has been selected by other participants. If the seat selected by the participant hasn't been selected by other participants, the secondary device 320 may display a scene of the VMR and other participants from an angle of view of the selected seat. If the seat selected by the participant has been selected by other participants, the secondary device 320 may notice the participant to reselect a seat.

At block S207, the secondary device 320 displays a seat map of the VMR.

Figure 6:
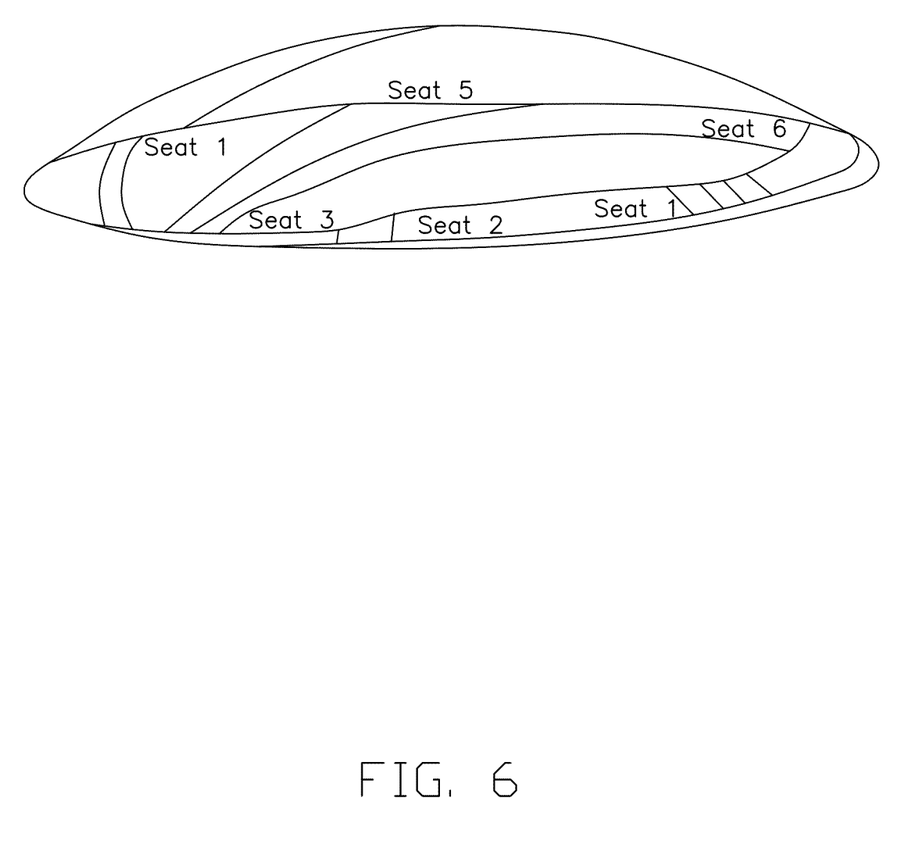
FIG. 6 illustrates a schematic view of another embodiment of the virtual meeting room.

In at least one embodiment, after the secondary device 320 transmitted the first voiceprint information to the server 200, the secondary device 320 displays the seat map of the VMR. Referring to FIG. 6, a circular VMR includes 6 seats, the 6 seats arranged in circular forms the seat map of the VMR for presenting a real visual effect of the VMR.

Figure 7:
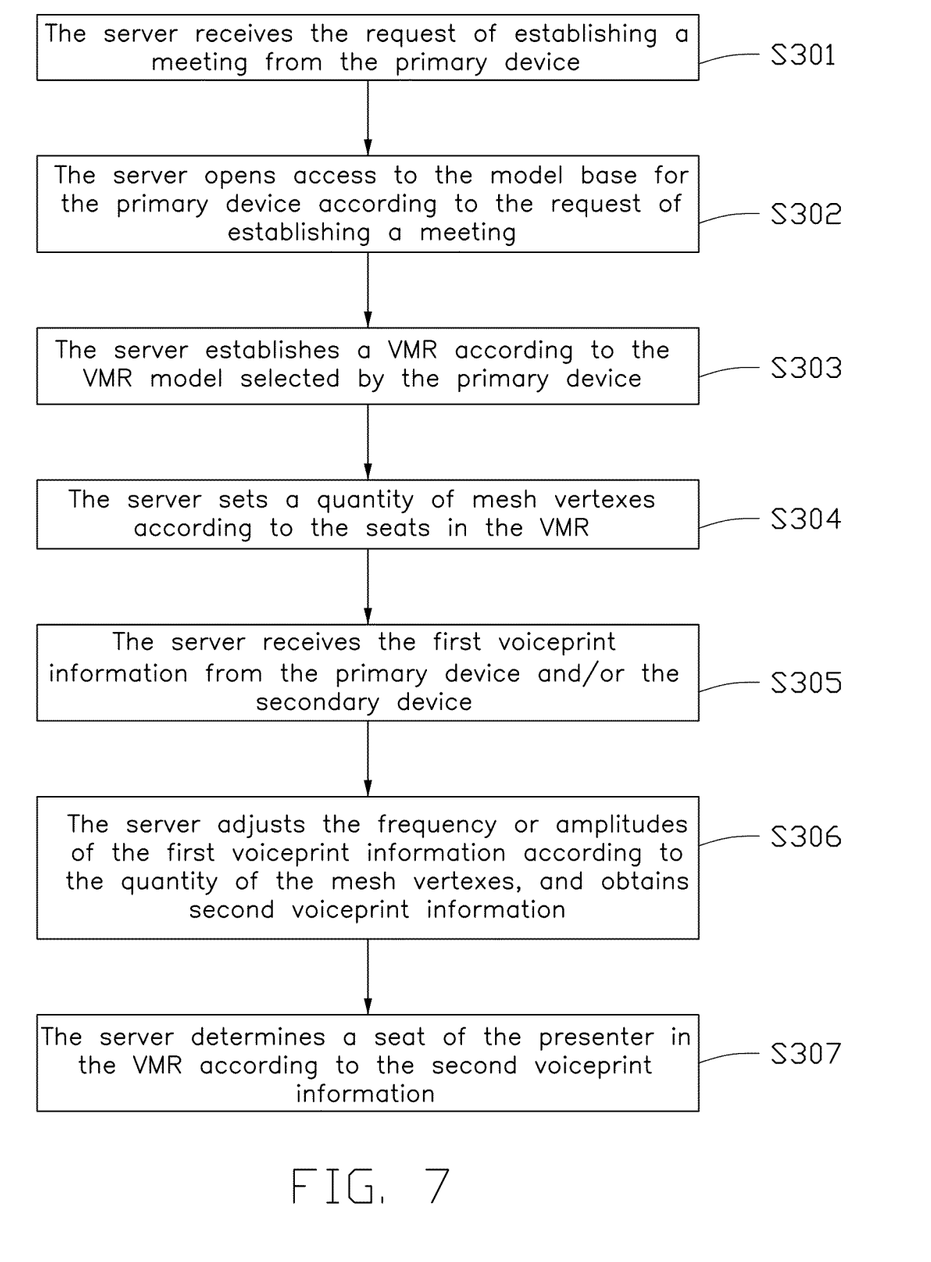
FIG. 7 is a flowchart of another embodiment of the method for processing audio.

FIG. 7 illustrates a flowchart of another embodiment of the method of the for processing audio.

In at least one embodiment, the method for processing audio may be applied in an apparatus, such as the server 200 shown in FIG. 1. The functions may be integrated in the server 200 for the method for processing audio. In another embodiment, the method for processing audio can be run in a form of software development kit in the apparatus.

The method is provided by way of example, as there are a variety of ways to carry out the method. Each block shown in FIG. 7 represents one or more processes, methods, or sub- routines carried out in the example method. Furthermore, the illustrated order of blocks is by example only and the order of the blocks can be changed. Additional blocks may be added or fewer blocks may be utilized, without departing from this disclosure. The example method can begin at block S301.

At block S301, the server 200 receives the request of establishing a meeting from the primary device 310.

In at least one embodiment, the host may triggers the control of establishing meeting in the three-dimensional image software, so the primary device 310 transmits the request of establishing a meeting to the server 200. The server 200 receives the request of establishing a meeting from the primary device 310.

At block S302, the server 200 opens access to the model base for the primary device 310 according to the request of establishing a meeting.

In at least one embodiment, the server 200 receives the request of establishing a meeting, opens access to the model base for the primary device 310, so as to allow the primary device 310 to access to the model base of the server 200 and invoke the VMR model in the model base.

At block S303, the server 200 establishes a VMR according to the VMR model selected by the primary device 310.

In at least one embodiment, the host selects a VMR model in the three-dimensional image software, to trigger the control of selecting VMR model, thus the primary device 310 selects a VMR model in the model base of the server 200. The server 200 establishes a VMR according to the VMR model selected by the primary device 310.

In at least one embodiment, the server 200 may establish a VMR model according to a predetermined VMR proportion, and provide animation images for being displayed by the primary device 310 and/or the secondary device 320 through a UV mapping tool.

In other embodiments, the server 200 may store images of VMRs, extract textural features from the images of VMRs, and add the textural features to predetermined base models by a paste tool, thus the primary device 310 and/or the secondary device 320 may display static images of the VMR.

At block S304, the server 200 sets a quantity of mesh vertexes.

The mesh is a base unit of composition of an image of the three-dimensional image software, the VMR is formed by several meshes. Each mesh includes four vertexes. When a coverage area of a seat of the VMR includes the more mesh vertexes, the greater density of the mesh vertexes will be. The server 200, based on the quantity of the mesh vertexes arranging in the seats of the VMR, sets different quantity of the mesh vertexes in the coverage areas of the seats, that is, the densities of the mesh vertexes of the coverage areas of the seats are different, so the seats and the quantity or the densities of the mesh vertexes may form one-to-one corresponding relations.

At block S305, the server 200 receives the first voiceprint information from the primary device 310 and/or the secondary device 320.

The first voiceprint information may include frequencies, amplitudes, and phase differences of the audio signals.

In at least one embodiment, when the host speaks, the host triggers the control of recording audio in the three-dimensional image software in the primary device 310, the primary device 310 records audio signals of the host through the first audio module 313 and extracts the first voiceprint information of the host from the audio signals, and further transmits the first voiceprint information to the server 200.

The server 200 receives the first voiceprint information from the primary device 310.

When the participant speaks, the participant triggers the control of recording audio in the browser application of the secondary device 320, the secondary device 320 records audio signals of the participant by the second audio module 323 and extracts the first voiceprint information of the participant from the audio signals, and further transmits the first voiceprint information to the server 200. The server 200 receives the first voiceprint information from the secondary device 320.

At block S306, the server 200 adjusts the frequency or amplitudes of the first voiceprint information according to the quantity of the mesh vertexes, and obtains second voiceprint information.

In at least one embodiment, each of the seats of the VMR has a quantity of the mesh vertexes. The server 200 adjusts the frequency or amplitudes of the first voiceprint information according to the quantity of the mesh vertexes, such as, the seats with greater quantity or density of the mesh vertexes, the higher frequency or greater amplitude of the first voiceprint information corresponding to the seats will be. When a quantity n1 of mesh vertexes of a coverage area of a first seat and a quantity n2 of mesh vertexes of a coverage area of a second seat meet: n1>n2, the server 200 adjusts the first voiceprint information from the first seat or the first voiceprint information from the second seat to meet: f1>f2 or a1>a2. The f1 indicates a frequency of the first voiceprint information from the first seat, f2 indicates a frequency of the first voiceprint information from the second seat, a1 indicates an amplitude of the first voiceprint information from the first seat, and a2 indicates an amplitude of the first voiceprint information from the second seat.

Figure 8:
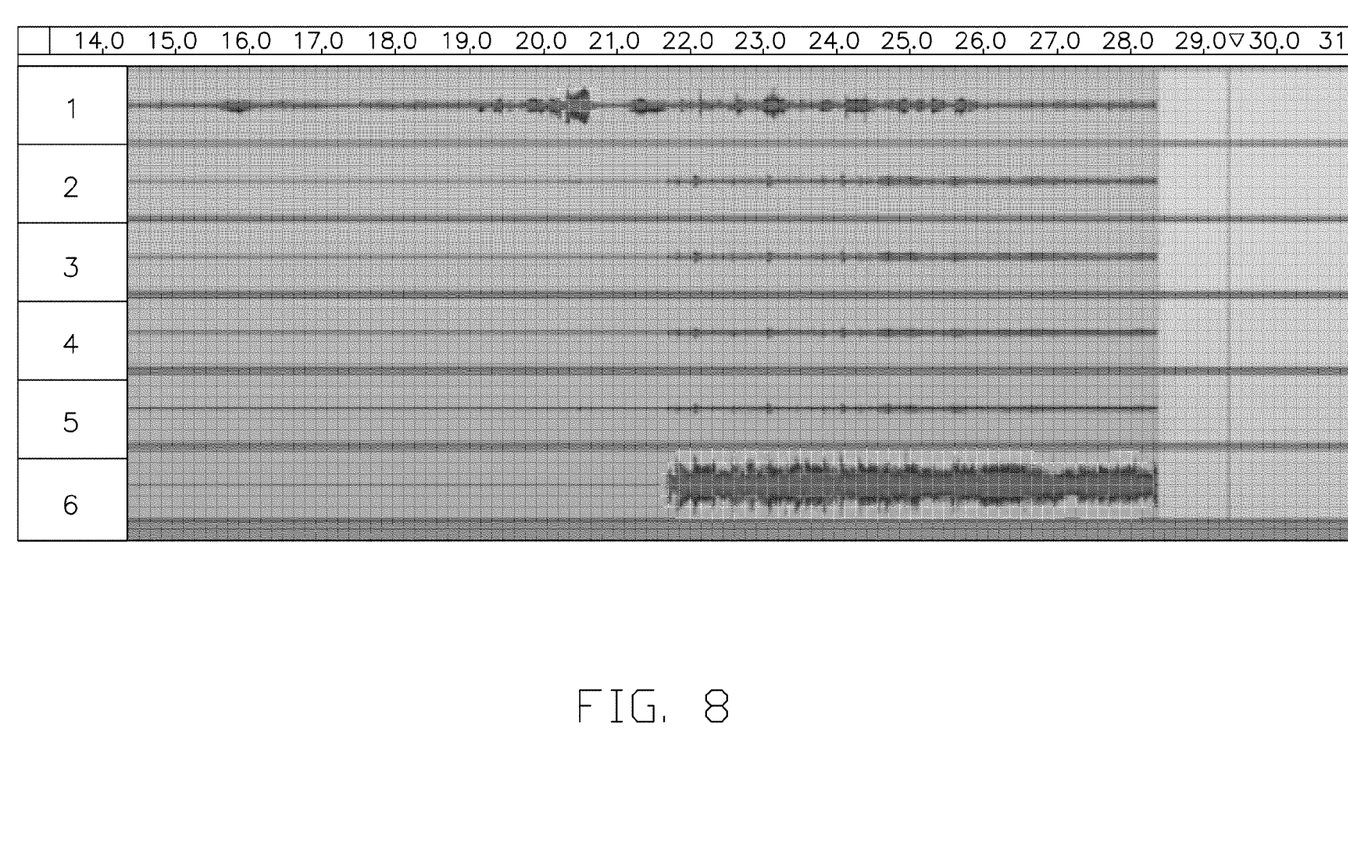
FIG. 8 illustrates a schematic view of at least one embodiment of first vocal print information utilized in the method.

For instance, referring to FIG. 8, the server 200 sets a quantity of mesh vertexes for each of the seats, when the server 200 receives first voiceprint information of 6 participants, processes 6 sections of first voiceprint information of the 6 participants, adjusts the frequencies or amplitudes of the first voiceprint information according to the quantities or densities of the mesh vertexes of each of the seats, to obtain 6 sections of second voiceprint information, so as to improve an identifiability of the voiceprint information.

At block S307, the server 200 determines a seat of the presenter in the VMR according to the second voiceprint information.

In at least one embodiment, when the server 200 obtains the first voiceprint information and cannot determine a source of the first voiceprint information, the server 200 establishes a corresponding relationship of the quantity of mesh vertexes of coverage areas of the seats in the VMR and the first voiceprint information, the coverage areas with more mesh vertexes, the higher frequency or greater amplitude of the first voiceprint information corresponding to the seats will be. The server 200 adjusts the frequencies or amplitudes of the first voiceprint information from different seats according to the quantity of mesh vertexes, to obtain second voiceprint information with better identifiability. Since the frequencies or amplitudes of the second voiceprint information of different seats are different, so the second voiceprint information and the seats may form one-to-one corresponding relations, the server 200 determines the seat of the presenter in the VMR according to the second voiceprint information.

Figure 9:
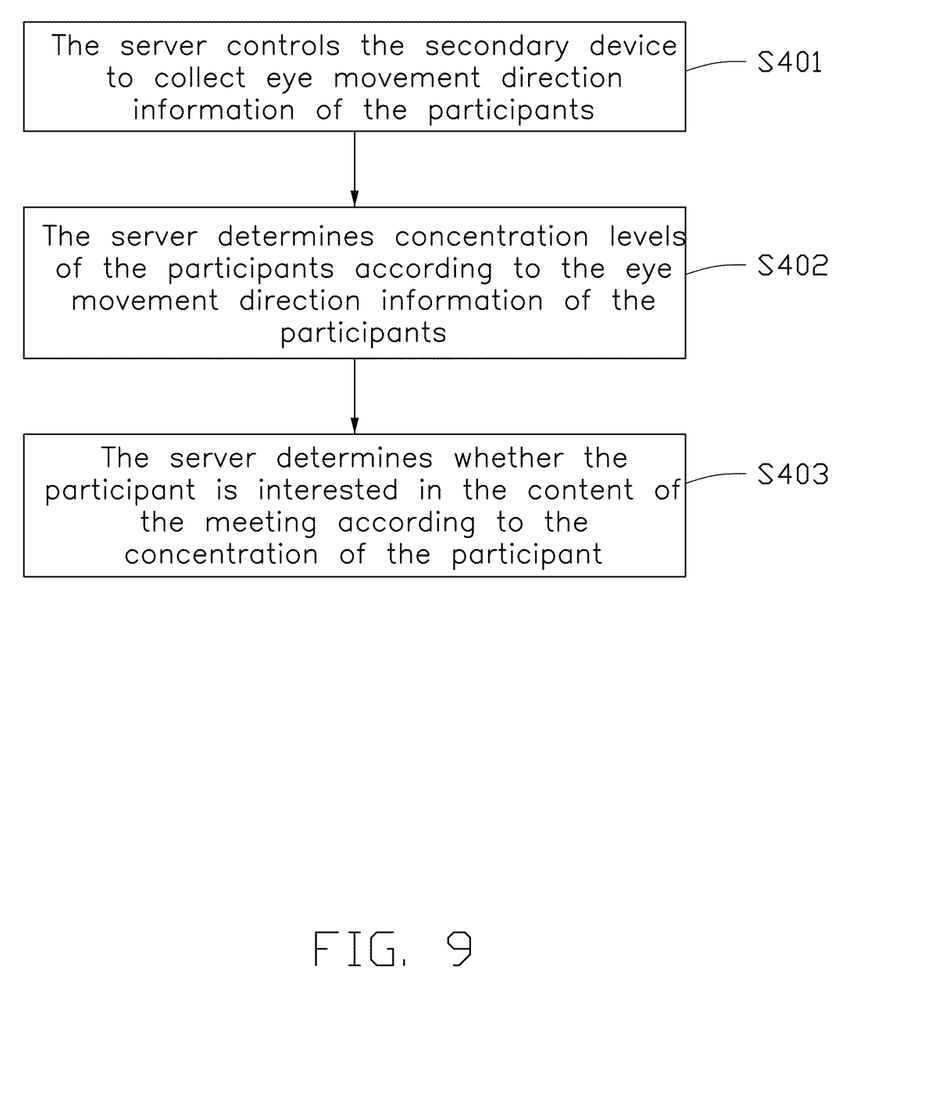
FIG. 9 is a flowchart of another embodiment of the method for processing audio.

FIG. 9 illustrates a flowchart of another embodiment of the method of the for processing audio.

In at least one embodiment, the method for processing audio may be applied in an apparatus, such as the server 200 shown in FIG. 1. The functions may be integrated in the server 200 for the method for processing audio. In another embodiment, the method for processing audio can be run in a form of software development kit in the apparatus.

The method is provided by way of example, as there are a variety of ways to carry out the method. Each block shown in FIG. 9 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S401.

At block S401, the server 200 controls the secondary device 320 to collect eye movement direction information of the participants.

In at least one embodiment, when one of the participants speaks, the server 200 identifies the voiceprint information of the participant, and controls the secondary device 320 to collect eye movement direction information of other participants.

At block S402, the server 200 determines concentration levels of the participants according to the eye movement direction information of the participants.

The concentration level indicates a concentration of the participant to the speak of the presenter or the content of the meeting. The higher concentration level indicates the more interested that the participant will be. When one of the participants speaks, the server 200 receives the eye movement direction information of other participants, and determines the concentration levels of other participants.

For instance, when one of the participants speaks, if the eye movement direction of one another participant focusses towards the presenter, that means the participant is concentrated, and the concentration level of the participant may be marked as 1. If the eye movement direction of the participant focusses beyond the presenter, that means the participant is not concentrated, and the concentration level of the participant may be marked as 0. If there are 10 rounds of speaks during the whole meeting, when the concentration level of one participant being marked as 1 for 6 times and being marked as 0 for 4 times, that the concentration of the participant to the content of the meeting is regarded as 6/10=0.6.

At block S403, the server 200 determines whether the participants are interested in the content of the meeting according to the concentration levels of the participant.

In at least one embodiment, the server 200 counts the concentration levels of the participants to the content of the meeting, and compares the concentration levels to a predetermined interested threshold. If the concentration level is greater than or equal to the predetermined interested threshold, the participant is interested in the content of the meeting is determined. If the concentration level is less than the predetermined interested threshold, the participant is not interested in the content of the meeting is determined.

For instance, the predetermined interested threshold is 0.6, during the whole meeting, if the concentration level of one participant is 0.5, which is less than the predetermined interested threshold, the participant is not interested in the content of the meeting is determined. If the concentration level of one participant is 0.7, which is greater than the predetermined interested threshold, the participant is interested in the content of the meeting is determined.

A non-transitory computer-readable storage medium including program instructions for causing the apparatus to perform the method for processing audio is also disclosed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for processing audio of a virtual meeting room (VMR), the VMR is configured to provide a meeting for participants, the method comprising:
    setting a quantity of mesh vertexes according to seats in the VMR;
    obtaining first voiceprint information of a presenter, the first voiceprint information comprising a frequency, an amplitude, and a phase difference of an audio signal;
    adjusting the frequency or the amplitude of the first voiceprint information according to the quantity of the mesh vertexes, and obtaining second voiceprint information;
    determining a seat of the presenter in the VMR according to the second voiceprint information;
    obtaining eye movement direction information of participants;
    determining concentration levels of the participants according to the eye movement direction information, wherein values of the concentration level comprise 0 and 1; and
    determining whether the participants are interested in a content of the meeting according to the concentration levels of the participants;
    wherein the determining concentration levels of the participants according to the eye movement direction information comprises:
        if an eye movement direction of the participant focuses towards the presenter, marking the concentration level of the participant as 1; and
        if the eye movement direction of the participant focuses beyond the presenter, marking the concentration level of the participant as 0.

2. The method according to claim 1, wherein the setting the quantity of mesh vertexes according to seats in the VMR comprises:
    setting different quantities of the mesh vertexes in coverage areas of the seats, to establish corresponding relations of the seats and the quantities of the mesh vertexes.

3. The method according to claim 1, wherein the adjusting the frequency or amplitude of the first voiceprint information according to the quantity of the mesh vertexes comprises:
    if a quantity of the mesh vertexes of a coverage area of a first seat is greater than a quantity of the mesh vertexes of a coverage area of a second seat, increasing a frequency of the first voiceprint information from the first seat, or decreasing a frequency of the first voiceprint information from the second seat, so the frequency of the first voiceprint information from the first seat is greater than the frequency of the first voiceprint information from the second seat.

4. The method according to claim 1, wherein the adjusting the frequency or amplitude of the first voiceprint information according to the quantity of the mesh vertexes comprises:
    if a quantity of the mesh vertexes of a coverage area of a first seat is greater than a quantity of the mesh vertexes of a coverage area of a second seat, increasing an amplitude of the first voiceprint information from the first seat, or decreasing an amplitude of the first voiceprint information from the second seat, so the amplitude of the first voiceprint information from the first seat is greater than the amplitude of the first voiceprint information from the second seat.

5. The method according to claim 1, further comprising:
    if there are several presenters in the meeting, counting the concentration levels of the participants to each of the presenters; and
    determining a concentration level of the participants to the content of the meeting according to the counted concentration levels of the participants.

6. The method according to claim 1, wherein the determining whether the participants are interested in a content of the meeting according to the concentration levels of the participants comprises:
    if the concentration levels are greater than or equal to a predetermined interested threshold, determining that the participants are interested in the content of the meeting; and
    if the concentration levels are less than the predetermined interested threshold, determining that the participants are not interested in the content of the meeting.

7. An apparatus for processing audio of a virtual meeting room (VMR), the VMR is configured to provide a meeting for participants, the apparatus comprising:
    a primary device configured to start the meeting;
    a server configured to establish a VMR according to program instructions from the primary device; and
    a secondary device configured to enter the VMR according to a meeting link from the primary device;
    wherein the server comprises:
        at least one processor; and
        at least one memory coupled to the at least one processor for storing program instructions; the at least one memory and the program instructions are configured to, with the at least one processor, cause the server to perform:
            setting a quantity of mesh vertexes according to seats in the VMR;
            obtaining first voiceprint information of a presenter, the first voiceprint information comprising a frequency, an amplitude, and a phase difference of an audio signal;

adjusting the frequency or the amplitude of the first voiceprint information according to the quantity of the mesh vertexes, and obtaining second voiceprint information;

determining a seat of the presenter in the VMR according to the second voiceprint information;

obtaining eye movement direction information of participants;

determining concentration levels of the participants according to the eye movement direction information, wherein values of the concentration level comprise 0 and 1; and determining whether the participants are interested in a content of the meeting according to the concentration levels of the participants;

wherein the determining concentration levels of the participants according to the eye movement direction information comprises:

if an eye movement direction of the participant focuses towards the presenter, marking the concentration level of the participant as 1; and if the eye movement direction of the participant focuses beyond the presenter, marking the concentration level of the participant as 0.

8. The apparatus according to claim 7, wherein the setting the quantity of mesh vertexes according to seats in the VMR comprises:

setting different quantities of the mesh vertexes in coverage areas of the seats, to establish corresponding relations of the seats and the quantities of the mesh vertexes.

9. The apparatus according to claim 7, wherein the adjusting the frequency or amplitude of the first voiceprint information according to the quantity of the mesh vertexes comprises:

if a quantity of the mesh vertexes of a coverage area of a first seat is greater than a quantity of the mesh vertexes of a coverage area of a second seat, increasing a frequency of the first voiceprint information from the first seat, or decreasing a frequency of the first voiceprint information from the second seat, so the frequency of the first voiceprint information from the first seat is greater than the frequency of the first voiceprint information from the second seat.

10. The apparatus according to claim 7, wherein the adjusting the frequency or amplitude of the first voiceprint information according to the quantity of the mesh vertexes comprises:

if a quantity of the mesh vertexes of a coverage area of a first seat is greater than a quantity of the mesh vertexes of a coverage area of a second seat, increasing an amplitude of the first voiceprint information from the first seat, or decreasing an amplitude of the first voiceprint information from the second seat, so the amplitude of the first voiceprint information from the first seat is greater than the amplitude of the first voiceprint information from the second seat.

11. The apparatus according to claim 7, wherein the memory and the program instructions configured to, with the at least one processor, cause the server further to perform:

if there are several presenters in the meeting, counting the concentration levels of the participants to each of the presenters; and determining a concentration level of the participants to the content of the meeting according to the counted concentration levels of the participants.

12. The apparatus according to claim 7, wherein the determining whether the participants are interested in a content of the meeting according to the concentration levels of the participants comprises:

if the concentration levels are greater than or equal to a predetermined interested threshold, determining that the participants are interested in the content of the meeting; and if the concentration levels are less than the predetermined interested threshold, determining that the participants are not interested in the content of the meeting.

13. A non-transitory computer readable medium comprising program instructions for causing an apparatus to perform at least the following:

setting a quantity of mesh vertexes according to seats in the VMR;

obtaining first voiceprint information of a presenter, the first voiceprint information comprising a frequency, an amplitude, and a phase difference of an audio signal;

adjusting the frequency or the amplitude of the first voiceprint information according to the quantity of the mesh vertexes, and obtaining second voiceprint information;

determining a seat of the presenter in the VMR according to the second voiceprint information;

obtaining eye movement direction information of participants;

determining concentration levels of the participants according to the eye movement direction information, wherein values of the concentration level comprise 0 and 1; and determining whether the participants are interested in a content of the meeting according to the concentration levels of the participants;

wherein the determining concentration levels of the participants according to the eye movement direction information comprises:

if an eye movement direction of the participant focuses towards the presenter, marking the concentration level of the participant as 1; and if the eye movement direction of the participant focuses beyond the presenter, marking the concentration level of the participant as 0.

* * * * *